(12) United States Patent
Koyama

(10) Patent No.: US 7,853,194 B2
(45) Date of Patent: Dec. 14, 2010

(54) MATERIAL PROCESSING APPARATUS, MATERIAL PROCESSING METHOD AND MATERIAL PROCESSING PROGRAM

(75) Inventor: Toshiya Koyama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 842 days.

(21) Appl. No.: 11/225,133

(22) Filed: Sep. 14, 2005

(65) Prior Publication Data

US 2006/0194189 A1 Aug. 31, 2006

(30) Foreign Application Priority Data

Feb. 28, 2005 (JP) .............................. 2005-052478

(51) Int. Cl.
G09B 3/00 (2006.01)
(52) U.S. Cl. .................. 434/350; 434/362; 434/323
(58) Field of Classification Search ................. 434/353, 434/362
See application file for complete search history.

(56) References Cited

U.S. PATENT DOCUMENTS

| | | | |
|---|---|---|---|
| 5,568,565 A * | 10/1996 | Minakata | 382/187 |
| 2003/0020963 A1* | 1/2003 | Currans | 358/406 |
| 2004/0026493 A1* | 2/2004 | Constantine | 235/375 |
| 2004/0264811 A1 | 12/2004 | Yano et al. | |

FOREIGN PATENT DOCUMENTS

| | | |
|---|---|---|
| JP | 06-060177 | 3/1994 |
| JP | A 06-266278 | 9/1994 |
| JP | 09-311621 | 12/1997 |
| JP | 2005-018603 | 1/2005 |
| JP | 2005-024693 | 1/2005 |

OTHER PUBLICATIONS

Office Action issued in JP Application No. 2005-046509 on Jun. 1, 2010 (with English translation).

* cited by examiner

Primary Examiner—Xuan M Thai
Assistant Examiner—Evan R Page
(74) Attorney, Agent, or Firm—Oliff & Berridge, PLC

(57) ABSTRACT

A material processing apparatus includes: a reading unit configured to obtain image data from material; a correct/incorrect determination recognizing unit that extracts entry contents of correct/incorrect determinations for answers to the answer fields from the image data; a distributed point information extracting unit that extracts the distributed point information from the image data; a distributed point acquiring unit that correlates extraction results by the correct/incorrect determination recognizing unit and the distributed point information extracting unit; and a point totaling unit that totals points on the correct/incorrect determinations entered into the material according to the extraction results by the correct/incorrect determination recognizing unit and the distributed point information extracting unit, and the result of the correlation.

8 Claims, 13 Drawing Sheets

FIG. 2

| SCIENCE FIFTH GRADE | 1. CHANGE IN WEATHER AND TEMPERATURE | GRADE CLASS | NAME | SCORE |

○ OR × EXTRACTED IMAGE      BINARIZED IMAGE

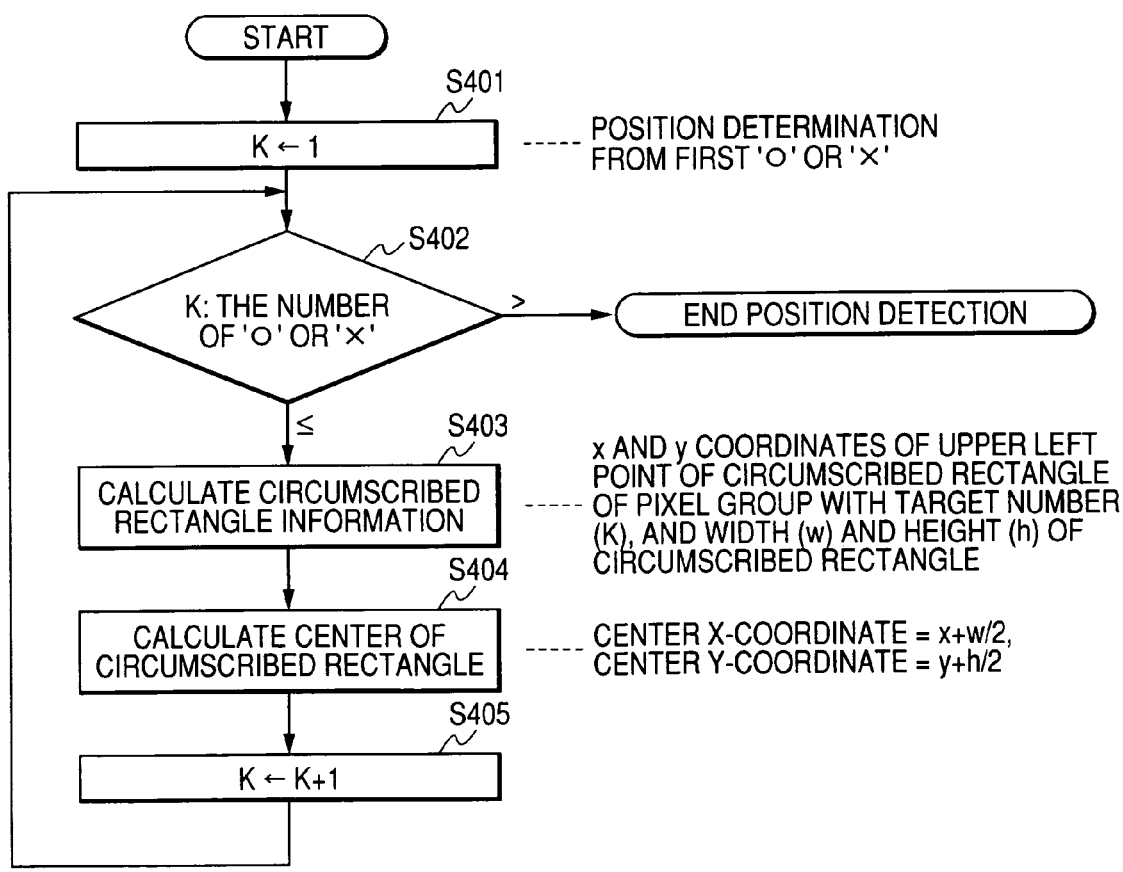

FIG. 9A
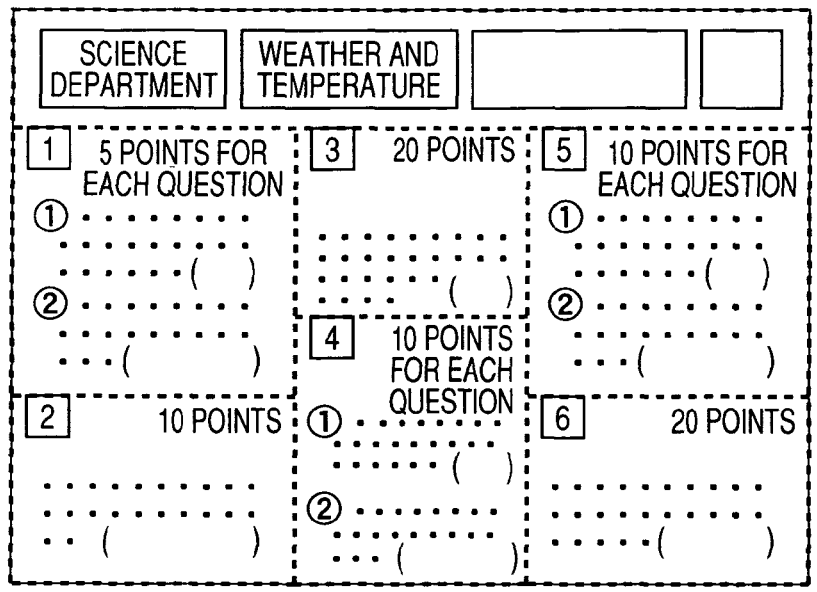
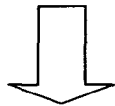
FIG. 9B
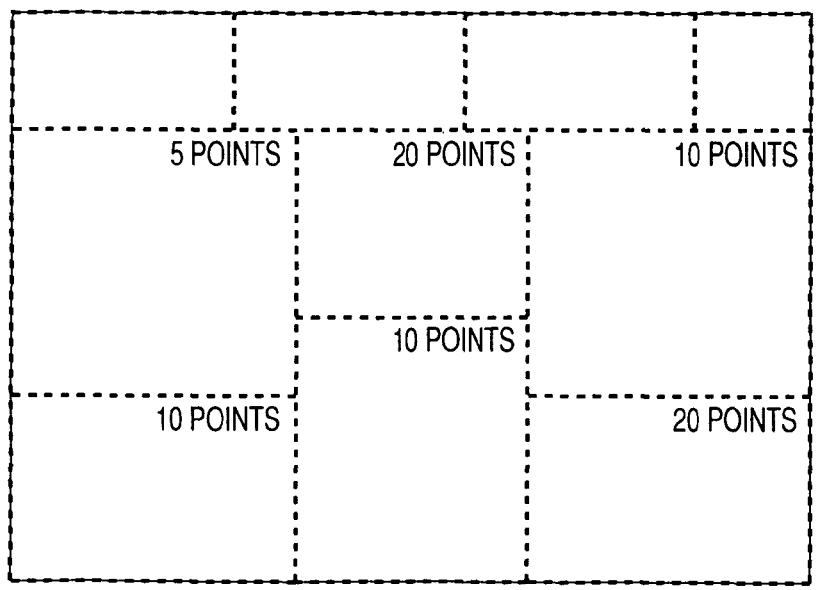

FIG. 12

| QUESTION NUMBER | ○ × | POINTS |
|---|---|---|
| 1 | ○ | 5 |
| 2 | ○ | 10 |
| 3 | × | 0 |
|  |  |  |
| N | ○ | 10 |

FIG. 13

| QUESTION NUMBER | DISTRIBUTED POINTS | X | Y | W | H |
|---|---|---|---|---|---|
| 1 | 5 | 200 | 500 | 240 | 120 |
| 2 | 10 | 450 | 500 | 300 | 120 |
| 3 | 5 | 800 | 300 | 240 | 120 |
|  |  |  |  |  |  |
| N | 10 | 1000 | 1700 | 360 | 240 |

MATERIAL PROCESSING APPARATUS, MATERIAL PROCESSING METHOD AND MATERIAL PROCESSING PROGRAM

BACKGROUND OF THE INVENTION

1. Field of the Invention

The present invention relates to a material processing apparatus materials, a material processing method, and a material processing program.

2. Background Art

Generally, for example, in educational institutes, such as schools or private schools, there are many cases in which educational teaching materials, such as test papers or sheets for exercises, are used. That is, it has been widely known that, with an educational teaching material having questions and answer fields, a pupil enters answers on the educational teaching material, and a teacher grades the entered answers.

As regards the educational teaching materials, simplification of grading is highly demanded. Accordingly, a system has been suggested in which, in order to realize simplification of grading, for example, a grading board and a grading pen are connected to a personal computer (hereinafter, referred to as 'PC') and grading is performed with the grading pen in a state in which an educational teaching material is positioned at a predetermined position of the grading board (for example, see JP-A-6-266278). In this system, position information and correct/incorrect information of the answers entered on the educational teaching material are inputted to the PC, such that automatic grading is performed on the answers on the educational teaching material by means of the PC.

However, it is not necessarily desirable that, at the time of grading the educational teaching material, dedicated constituent devices, such as the grading board, the grading pen, and the like, need to be provided. This is because the dedicated constituent devices cause the complex configuration of the entire system or high costs. Further, if the dedicated constituent devices need to be provided, compatible educational teaching materials may be limited, and thus versatility for the educational teaching materials may be limited.

On the other hand, in recent years, the PC, a copy machine, or a multi-functional machine, in which a scan function, a print function, and a network communication function are integrated, is generally installed and used.

For this reason, as regards grading of the educational teaching material, for example, the educational teaching material, on which the entry of a correct/incorrect determination, such as 'o' or 'x', is made, is read by use of the scan function of the copy machine or the like, and then an image processing is performed on image data, which is the read result, by use of an image processing function of the PC or the like. Accordingly, automatic grading for the answers on the educational teaching material can be performed, without providing special constituent devices. Specifically, if image data is obtained from the educational teaching material, the entry contents of correct/incorrect determinations are extracted from image data, and the points of the correct/incorrect determinations entered on the educational teaching material are totaled. Further, the content of the name put to the educational teaching material by an answerer is extracted from image data and the answerer is specified by use of an OCR (Optical Character Reader) technology or the like. The totaled result of the points is outputted in correlating with the determination result of the answerer. Accordingly, the same result of automatic grading as that in Patent Document 1 described above is obtained.

Here, at the time of grading the educational teaching material described above, the points distributed to the correct/incorrect determinations, that is, the points distributed to the questions need to be recognized, in addition to the extraction of the entry contents of the correct/incorrect determinations. This is because, if the points distributed to the respective questions are not known, totaling of the points is not performed. For this reason, in order to perform grading of the educational teaching material, information (hereinafter, referred to as distributed point information) for specifying the points distributed to the respective questions needs to be provided.

On the educational teaching material, since the plurality of questions and the answer fields thereof are distributed, the distributed points generally differ from one another. Besides, various kinds of educational teaching materials exit, for example, by subjects or grades of pupils.

As regards grading of the educational teaching material, the distributed point information is stored in advance in a system or device, which performs grading, and is used at the time of grading. However, in view of a trouble in creating or inputting the distributed point information, it is not desirable.

SUMMARY OF THE INVENTION

A material processing apparatus has a reading unit, a correct/incorrect determination recognizing unit, a distributed point information extracting unit, a distributed point acquiring unit, and a point totaling unit. The reading unit performs image reading for a material having answer fields and distributed point information thereof, so as to obtain image data from the material. The correct/incorrect determination recognizing unit extracts entry contents of correct/incorrect determinations for answers to the answer fields from the image data, with respect to the material in which the answers and the correct/incorrect determinations are entered. The distributed point information extracting unit extracts the distributed point information from the image data with respect to at least one of the material in which the answers to the answer fields and the correct/incorrect determinations for the answers are entered and the material on which the answers and the correct/incorrect determinations are not entered. The distributed point acquiring unit correlates an extraction result by the correct/incorrect determination recognizing unit and an extraction result by the distributed point information extracting unit. The a point totaling unit totals points on the correct/incorrect determinations entered into the material according to the extraction result by the correct/incorrect determination recognizing unit, the extraction result by the distributed point information extracting unit, and a result of correlation by the distributed point acquiring unit.

BRIEF DESCRIPTION OF THE DRAWINGS

The present invention may be more readily described with reference to the accompanying drawings:

FIG. 2 is a diagram illustrating a specified example of an educational teaching material.

FIG. 7 is a flowchart showing an example of a recognition processing sequence of an entry position of a correct/incorrect determination.

FIGS. 9A and 9B are diagram illustrating an example of a distributed point information extraction processing to be performed when the distributed point information is recognized.

FIG. 12 is a diagram illustrating a specified example of the grading result by questions.

FIG. 13 is a diagram illustrating a specified example of answer field position region information.

DETAILED DESCRIPTION OF THE EMBODIMENTS

Hereinafter, a teaching material processing apparatus, a teaching material processing method, and a teaching material processing program according to the present invention will be described with reference to the drawings.

Figure 1:
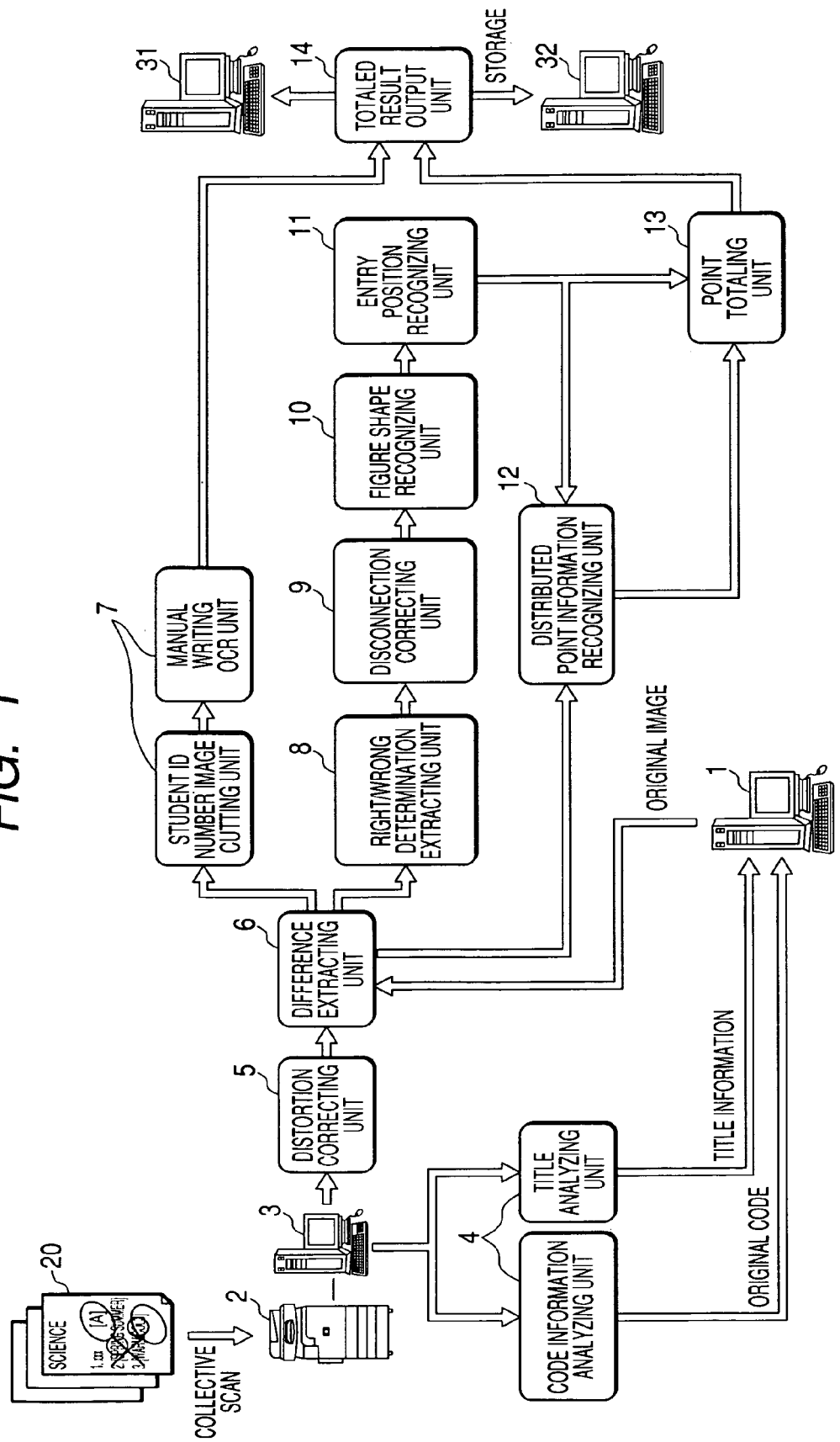
FIG. 1 is a block diagram showing an example of the schematic configuration of a teaching material processing apparatus according to the present invention.

First, the schematic configuration of the teaching material processing apparatus will be described. FIG. 1 is a block diagram showing an example of the schematic configuration of the teaching material processing apparatus according to the present invention.

As shown in FIG. 1, the teaching material processing apparatus described herein has a database unit 1, an image reading unit 2, an image data analyzing unit 3, a teaching material discriminating unit 4, a distortion correcting unit 5, a difference extracting unit 6, an answerer extracting unit 7, a right or wrong determination extracting unit 8, a disconnection correcting unit 9, a figure shape recognizing unit 10, an entry position recognizing unit 11, a distributed point information recognizing unit 12, a point totaling unit 13, and a totaled result output unit 14.

The database unit 1 holds and accumulates electronic data for educational teaching materials.

Here, an educational teaching material will be simply described. FIG. 2 is a diagram illustrating a specified example of an educational teaching material. As shown in FIG. 2, an educational teaching material 20 has questions and answer fields 21 thereof. Specifically, a test paper, a sheet for exercise, or the like used in an educational institute corresponds to the educational teaching material 20. However, the educational teaching material 20 may have at least two answer fields 21. The answer fields 21 may be not necessarily described with respect to the question sentences.

Further, the educational teaching material 20 has an identification information field 22 for identifying and specifying that educational teaching material and an answerer information field 23 relating to an answerer who enters answers to the answer fields 21. It is assumed that, in the identification information field 22, for example, a subject, a title, an applicable grade, and the like of the educational teaching material are described in advance. However, in addition to or separately from such descriptions, code information for identifying the educational teaching material 20 may be filled. The code information can be filled by use of a known technology. As a specified example thereof, for example, like 'iTone' (Registered Trademark), a technology can be used in which the forms (positions or shapes) of pixels constituting a multi-lined screen or a dot screen as gray-scale representation are changed, and then digital information is filled into a halftone image. On the other hand, in the answerer information field 23, a class, a student ID number, a name or the like of the answerer can be entered.

In addition, the educational teaching material 20 has distributed point information 24 to the answer fields 21. The distributed point information 24 is information for specifying points distributed to the answer fields 21, in which characters of 'numeric' and 'point' corresponding to the points to be distributed are described. That is, as regards the answer fields 21 on the educational teaching material, the distributed point information 24 is information for specifying what point is distributed to an answer field 21 existing in anyone position. As long as the points to be distributed can be specified, the distributed point information 24 is not limited to the characters of 'numeric' and 'point', but may have predetermined code information, for example. Further, the distributed point information 24 may be arranged to separately correspond to the respective answer fields 21 on the educational teaching material 20 or may be collectively arranged for the answer fields 21 having the same point to be distributed. In any case, it is assumed that the distributed point information 24 is arranged with constant regularity in the vicinity of the answer fields 21 (arranged in the vicinities of the ends of the question sentences) so as to allow the correlation with the answer fields 21, of which points are specified by the distributed point information 24, to be apparent.

Electronic data of such an educational teaching material 20 can be obtained by specifying the answer fields 21, the identification information field 22, the distributed point information 24, or the like, or layouts thereof. As long as electronic data can be held and accumulated into the database unit 1, the data format does not matter. For example, image data or application document data created by a document creation application may be used.

Further, in FIG. 1, the image reading unit 2 reads images from the educational teaching material 20, in which the answers onto the answer fields 21, the name or the like onto the answerer information field 23, and the correct/incorrect determinations for the answers (specifically, figures, such as 'o' or 'x') are entered, by use of a known optical image reading technology so as to obtain image data therefrom. That is, the image reading unit 2 functions as a reading means in the present invention.

The image data analyzing unit 3 performs an analysis processing on image data obtained by the image reading unit 2. As the analysis processing, layout analysis, separation of characters and figures, character recognition, code information recognition, figure processing, color component recognition, and the like can be exemplified. All of these can be implemented by use of a known image processing technology, and thus, herein, the detailed descriptions thereof will be omitted.

The teaching material discriminating unit 4 has at least one of a title analyzing unit and a code information analyzing unit, and identifies and specifies the educational teaching material, which is the original of image data obtained by the image reading unit 2 on the basis of the result of the analysis processing by the image data analyzing unit 3, in particular, at least one result of the title analysis by the title analyzing unit and the code analysis by the code information analyzing unit for the identification information field 22. At this time, the teaching material discriminating unit 4 compares image data to the educational teaching material, of which electronic data is held and accumulated into the database unit 1, and, if corresponding electronic data is not held and accumulated into the database unit 1, judges as an error in identifying and specifying the educational teaching material. That is, the teaching material discriminating unit 4 specifies electronic data, which is to be compared to image data obtained by the image reading unit 2, from the analysis result by the image data analyzing unit 3.

As regards image data obtained by the image reading unit 2, the distortion correcting unit 5 corrects image distortion in image data. As the correction of image distortion, gradient correction, expansion/contraction correction in a main scanning direction or a sub scanning direction, and the like can be exemplified. All of these can be implemented by use of a known image processing technology, and thus, herein, the detailed descriptions thereof will be omitted.

The difference extracting unit 6 compares image data, which is obtained by the image reading means 2 and then is subjected to the correction processing of image distortion by the distortion correcting unit 5, and electronic data in the database unit 1 as the comparison target on the basis of the identification and specification result of the educational teaching material by the teaching material discriminating unit 4, and extracts the difference between them. Moreover, the method of the difference extraction processing itself can be implemented by use of a known image processing technology, and thus, herein, the detailed description thereof will be omitted.

The answerer extracting unit 7 has at least one of a student ID number information cutting unit and a manual writing OCR (Optical Character Reader) unit or both of them. The answerer extracting unit 7 extracts answerer information in the educational teaching material read by the image reading unit 2 through character information extraction by the student ID number information cutting unit or a character recognition processing by the manual writing OCR unit from the difference for the answerer information field 23 among differences extracted by the difference extracting unit 6, on the basis of the result of the analysis processing by the image data analyzing unit 3. As the answerer information, information for identifying the answerer, such as the class, the student ID number, the name, and the like of the answerer, can be exemplified.

The correct/incorrect determination extracting unit 8 further extracts the entry contents of the correct/incorrect determinations from the difference extracted by the difference extracting unit 6 on the basis of the result of the analysis processing by the image data analyzing unit 3. The extraction of the entry contents of the correct/incorrect determinations may be performed, for example, by extracting one having a predetermined color component through a color component recognition processing on the extraction result by the difference extracting unit 6. This is because the entry of the correct/incorrect determination is generally performed with a red color.

The disconnection correcting unit 9 performs a disconnection correction processing on the extraction result by the correct/incorrect determination extracting unit 8. The disconnection correction processing connects extracted line segments and removes the disconnection of the extracted line segments. That is, the disconnection correcting unit 9 functions as a disconnection correcting means of the present invention.

The figure shape recognizing unit 10 recognizes the entry contents of the correct/incorrect determinations, which are extracted by the correct/incorrect determination extracting unit 8 and are subjected to the disconnection correction by the disconnection correcting unit 9 through shape recognition. The shape recognition may be performed through pattern matching with the figure shape of 'o' or 'x', for example. That is, the figure shape recognizing unit 10 recognizes whether the entry content of the correct/incorrect determination is 'correct (o)' or 'incorrect (x)'.

Further, the entry position recognizing unit 11 recognizes the entry position on the educational teaching material, with respect to the entry content of the correct/incorrect determination, of which shape is recognized by the figure shape recognizing unit 10. The recognition of the entry position may be performed through coordinate analysis on the educational teaching material, for example.

That is, the figure shape recognizing unit 10 and the entry position recognizing unit 11 function as correct/incorrect determination recognizing means of the present invention.

The distributed point information recognizing unit 12 extracts the distributed point information 24 of the educational teaching material 20 from image data, which is obtained by the image reading unit 2 and then is subjected to the correction processing of image distortion by the distortion correcting unit 5, and recognizes what are points distributed to an answer existing in any one position among the answers on the educational teaching material. Moreover, the distributed point information recognizing unit 12 will be described below in detail.

The point totaling unit 13 totals the points of the correct/incorrect determinations entered into the educational teaching material, of which image is read by the image reading unit 2, on the basis of the recognition result of the entry content of the correct/incorrect determination by the figure shape recognizing unit 10, the recognition result of the entry position of the correct/incorrect determination by the entry position recognizing unit 11, and the recognition result of the distributed point information 24 for each answer field 21 by the distributed point information recognizing unit 12. That is, the point totaling unit 13 functions as a point totaling means of the present invention.

The totaled result output unit 14 outputs the totaled result of the points by the point totaling unit 13 in correlating with the answerer information extracted by the answerer extracting unit 7. Moreover, as an output destination of the totaled result output unit 14, a database device 31 or a file server device 32, which is connected to the teaching material processing apparatus to manage the totaled result of the points on the educational teaching material, can be exemplified.

Moreover, among the respective parts 1 to 14 described above, the image reading unit 2 may be implemented by use of a copy machine, a multi-functional machine, or a scanner device, which has a function of an image reading device. In this case, if an automatic document feeder (ADF) is additionally provided, image reading on a plurality of educational teaching materials can be consecutively performed.

Further, other parts 1 and 3 to 14, excluding the image reading unit 3, can be implemented by use of a computer apparatus, which implements an information storage processing function, an image processing function, and an operation processing function by executing a predetermined program, such as a PC. In this case, the predetermined program required for implementing the respective parts 1 and 3 to 14 may be installed in the PC in advance. Alternatively, the predetermined program may be provided while being stored in a computer readable storage medium or may be distributed via a wired or wireless communication means, instead of being installed in advance. That is, the teaching material processing apparatus having the configuration described above can be implemented by a teaching material processing program, which causes a computer connected to the image reading device to function as a teaching material processing apparatus.

Figure 3:
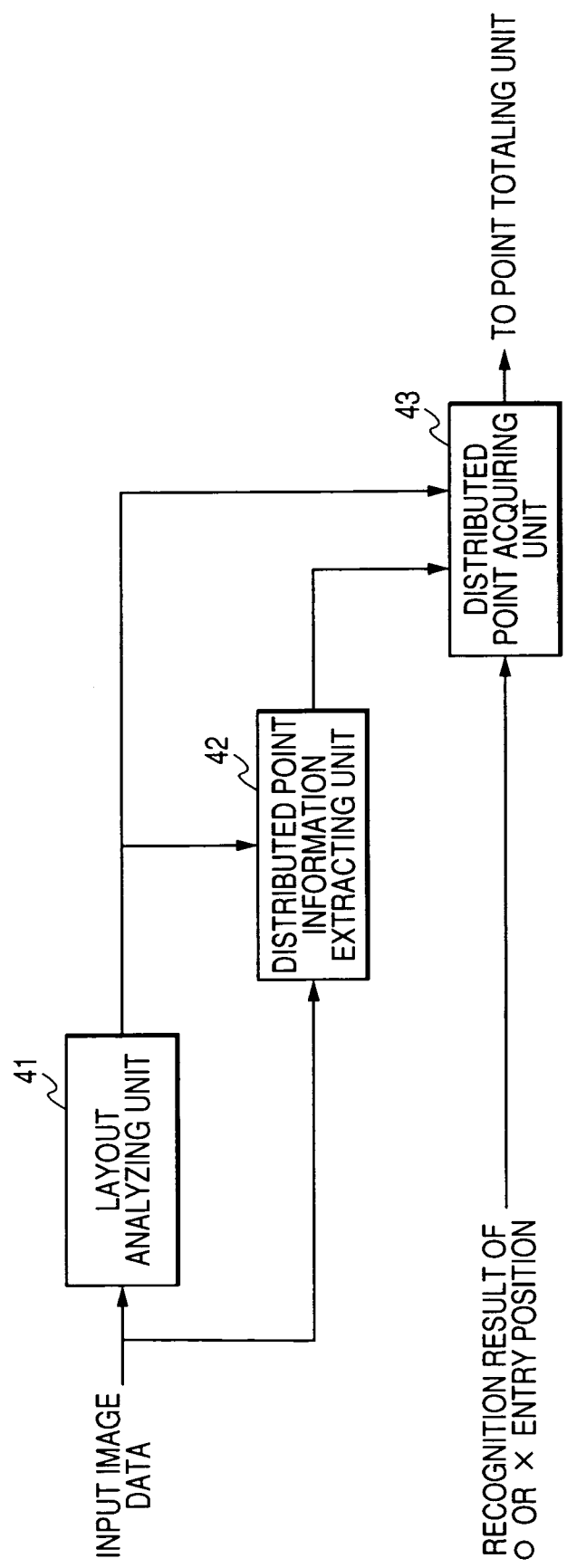
FIG. 3 is a block diagram showing an example of the functional configuration of a distributed point information recognizing unit of the teaching material processing apparatus according to the present invention.

Here, among the respective parts 1 to 14 described above, the distributed point information recognizing unit 12 will be described in detail. FIG. 3 is a block diagram showing an example of the functional configuration of the distributed point information recognizing unit. As shown in FIG. 3, the distributed point information recognizing unit 12 has a layout analyzing unit 41, a distributed point information extracting unit 42, and a distributed point acquiring unit 43.

The layout analyzing unit 41 performs layout analysis on image data, which is obtained by the image reading unit 2 and then is subjected to the correction processing of image distortion by the distortion correcting unit 5. More specifically, the layout analyzing unit 41 analyzes the layouts on the educational teaching material 20, such as 'fields (multi columns)', and recognizes the arrangement configuration of the answer fields 21 or the distributed point information 24. Then, the layout analyzing unit 41 notifies the distributed point acquiring unit 43 of the analysis result. That is, the layout analyzing unit 41 functions as a layout analyzing means of the present invention.

The distributed point information extracting unit 42 extracts all distributed point information 24 existing on the educational teaching material 20 on the basis of image data, which is obtained by the image reading unit 2 and is subjected to the correction processing of image distortion by the distortion correcting unit 5. The extraction of the distributed point information 24 may be performed by extracting one having the characters of 'numeric' and 'point' through character recognition. That is, the distributed point information extracting unit 42 functions as a distributed point information extracting means of the present invention.

The distributed point acquiring unit 43 specifies what point is distributed to the answer field 21 existing in any one position on the basis of the result of the layout analysis by the layout analyzing unit 41 and the extraction result of the distributed point information 24 by the distributed point information extracting unit 42. The specification is performed by correlating the extraction result of the distributed point information 24 by the distributed point information extracting unit 42 with the extraction result of the entry content of the correct/incorrect determination by the figure shape recognizing unit 10 and the entry position recognizing unit 11. The correlation may be performed on the basis of the distance between the entry position of the correct/incorrect determination for the answer entered into the answer field 21 and the arrangement position of the distributed point information 24. For example, the entry position of the correct/incorrect determination and the arrangement position of the distributed point information 24 may be correlated with each other at the closest distance. That is, the distributed point acquiring unit 43 functions as a distributed point acquiring means of the present invention.

Figure 4:
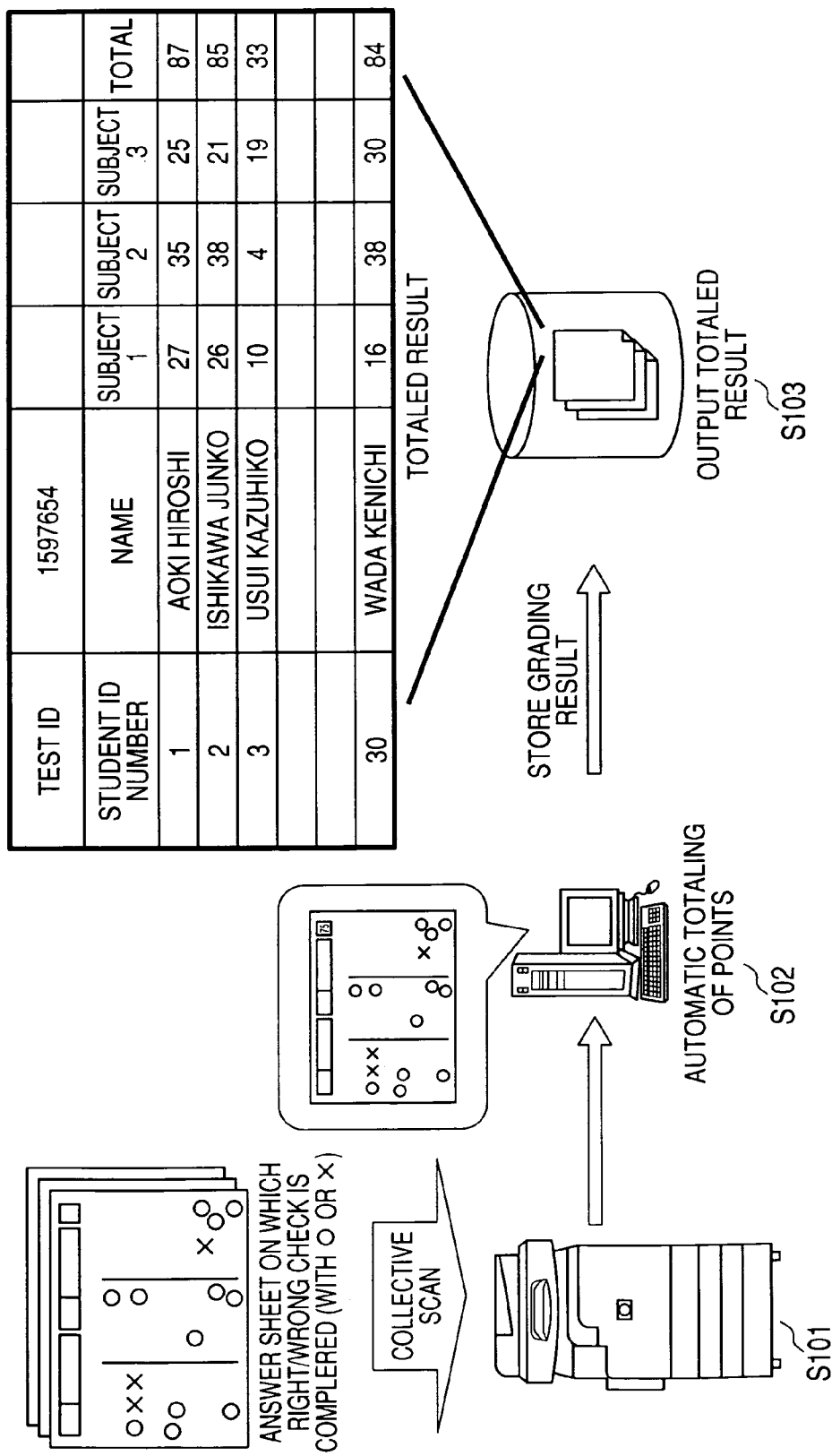
FIG. 4 is a diagram illustrating an example of a processing operation in the teaching material processing apparatus according to the present invention.

Next, an example of the processing operation in the teaching material processing apparatus (including the case in which the teaching material processing apparatus is implemented by the teaching material processing program) constituted in the above-described manner, that is, a sequence of a teaching material processing method according to the present invention will be described. FIG. 4 is a diagram illustrating an example of the processing operation in the teaching material processing apparatus according to the present invention.

When the teaching material processing apparatus is used, first, the image reading unit 2 performs image reading for the educational teaching material 20, on which a pupil or the like enters his name or the like into the answerer information field 23 and the answers into the answer fields 21, and a teacher or the like enters figures, such as 'o' or 'x', for the answers entered into the answer fields 21, and obtains image data from that educational teaching material 20 (Step 101) (hereinafter, 'step' is simply referred to as 'S'). At this time, if the ADF is used, image reading is collectively performed for a plurality of educational teaching materials 20 in one group, for example, the same class. Therefore, image data can be consecutively obtained from the respective educational teaching materials 20. Then, image data obtained by image reading is held in a memory or the like, which is used as a work area.

Then, the following automatic grading processing is sequentially performed for image data obtained from the respective educational teaching materials 20 (S102).

That is, the image data analyzing unit 3 performs the analysis processing for image data obtained from any one educational teaching material 20, and the teaching material discriminating unit 4 identifies and specifies the educational teaching material 20 on the basis of the result of the analysis processing. For example, the identification and specification may be performed through the title analysis of 'SCIENCE', 'FIFTH GRADE', and '1. CHANGE IN WEATHER AND TEMPERATURE' or the code analysis for the code information filled into the teaching material discriminating unit 4. With the identification and specification, in the teaching material discriminating unit 4, electronic data, which is the comparison target to image data obtained by the image reading means 2, can be specified. Moreover, the identification and specification may be sequentially performed for the plurality of educational teaching materials 20, which are subjected to image reading by the image reading unit 2. Alternatively, since all the educational teaching materials 20 to be collectively processed in one group are generally the same, the identification and specification may be performed only for the educational teaching material 20 to be processed first.

If the teaching material discriminating unit 4 specifies electronic data, the database unit 1 takes out corresponding electronic data from electronic data held and accumulated therein and delivers that electronic data to the difference extracting unit 6.

Further, for image data obtained from any one educational teaching material 20, the distortion correcting unit 5 performs the correction of image distortion in that image data. The correction of image distortion is performed to correct image distortion generated at the time of image reading by the image reading unit 2 and to enhance precision of the comparison to electronic data, the difference extraction, and the like to be performed subsequently.

Then, the difference extracting unit 6 compares electronic data delivered from the database unit 1 to image data, which is obtained by the image reading unit 2 and is subjected to the correction of image distortion by the distortion correcting unit 5, and extracts the difference between them. With the difference extraction, the entry contents into the answerer information field 23 and the answer fields 21, and the entry contents of the correct/incorrect determinations for the answer fields 21 are extracted.

If the difference extracting unit 6 extracts the difference, subsequently, the answerer extracting unit 7 specifies name information to the answerer of the educational teaching material, which is subjected to image reading by the image reading unit 2, through the character recognition processing for the difference or the like. Accordingly, the class, the student ID number, the name, and the like of the answerer, who enters the answers into any one educational teaching material 20, can be specified.

Further, for the difference extraction result by the difference extracting unit 6, in order to extract the entry contents of the correct/incorrect determinations into the answer fields 21, the correct/incorrect determination extracting unit 8 further extracts a predetermined color component, for example, a red component, from the difference extraction result. When the extraction result has image data, the extraction of the predetermined color component can be performed by paying attention to color component data constituting that image data.

In general, there are many cases in which the entry of the figures of the correct/incorrect determinations, such as 'o' or 'x', on the educational teaching material 20 overlaps the question sentences, the frame for specifying the answer fields 21, the entry contents into the answer fields 21, and the like. For this reason, the extraction result of the predetermined color component by the correct/incorrect determination extracting unit 8 may have removed overlap portions, that is, disconnected portions in the figures, such as 'o' or 'x'. Accordingly, for the extraction result of the predetermined color component by the correct/incorrect determination extracting unit 8, the disconnection correcting unit 9 performs the disconnection correction processing.

Here, the disconnection correction processing by the disconnection correcting unit 9 will be described in detail.

FIG. 5 is a diagram illustrating an example of the disconnection correcting processing.

Figure 5A:
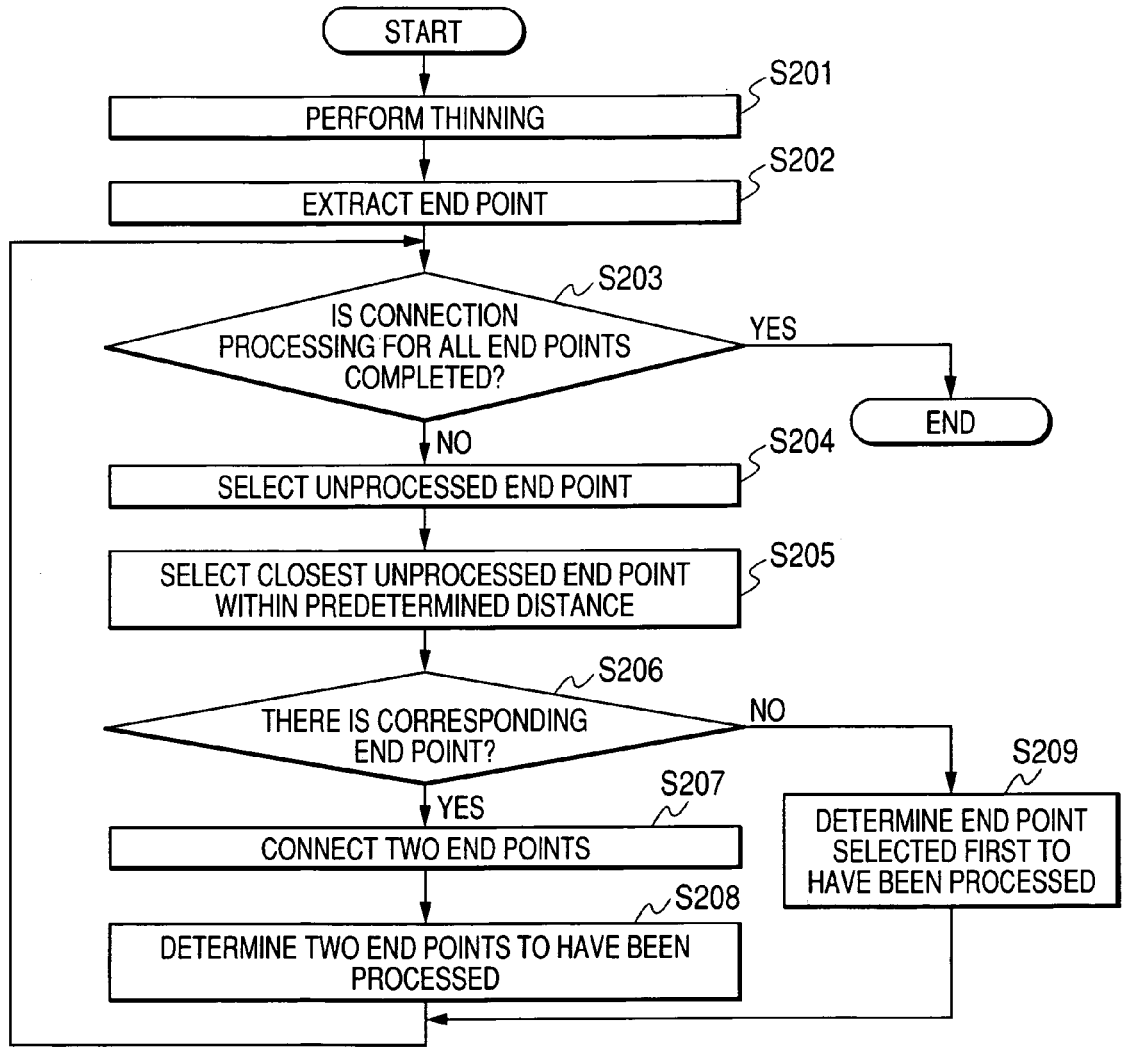
FIGS. 5A and 5B are diagrams illustrating an example of a disconnection correction processing.

In the disconnection correction processing, as shown in FIG. 5A, for the extraction result of the predetermined color component by the correct/incorrect determination extracting unit 8, that is, the extraction result, which should be the figure, such as 'o' or 'x', a thinning processing is executed (S201), and then an end point extraction processing is executed (S202). Accordingly, when the disconnected portion occurs in the figure, such as 'o' or 'x', the end point in the disconnected portion is extracted. Moreover, the thinning processing and the end point extraction processing to be performed at this time may be performed by use of known technologies, and thus, therein the detailed descriptions thereof will be omitted.

Then, after the end point is extracted, for all extracted end points, the following processing is executed (S203). That is, first, one of unprocessed end points is selected (S204), and an unprocessed end point (hereinafter, referred to as 'second endpoint') within a predetermined distance previously set from and closest to the selected end point (hereinafter, referred to as 'first end point') is selected (S205). Then, if there is the second end point (S206), the first end point and the second end point are connected to each other (S207), and both of the first end point and the second end point are set to have been processed (S208). On the other hand, if there is not the second end point (S206), the connection between the end points is not performed, and the first end point is set to haven been processed (S209). Such a processing is performed for all end points until the unprocessed end points do not exist (S203 to S209).

Figure 5B:
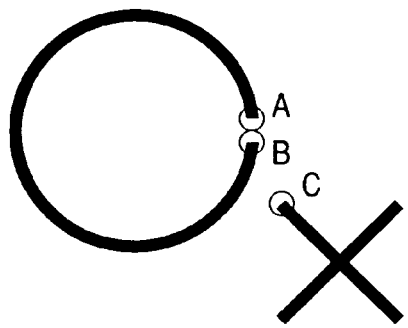

Accordingly, for example, when the figure shown in FIG. 5B is extracted and end points B and C exist in the predetermined distance from an end point A, the end point B closest to the end point A is connected to the end point A, such that the disconnected portion in the figure 'o' is corrected.

FIG. 6 is a diagram illustrating another example of the disconnection correction processing.

Figure 6A:
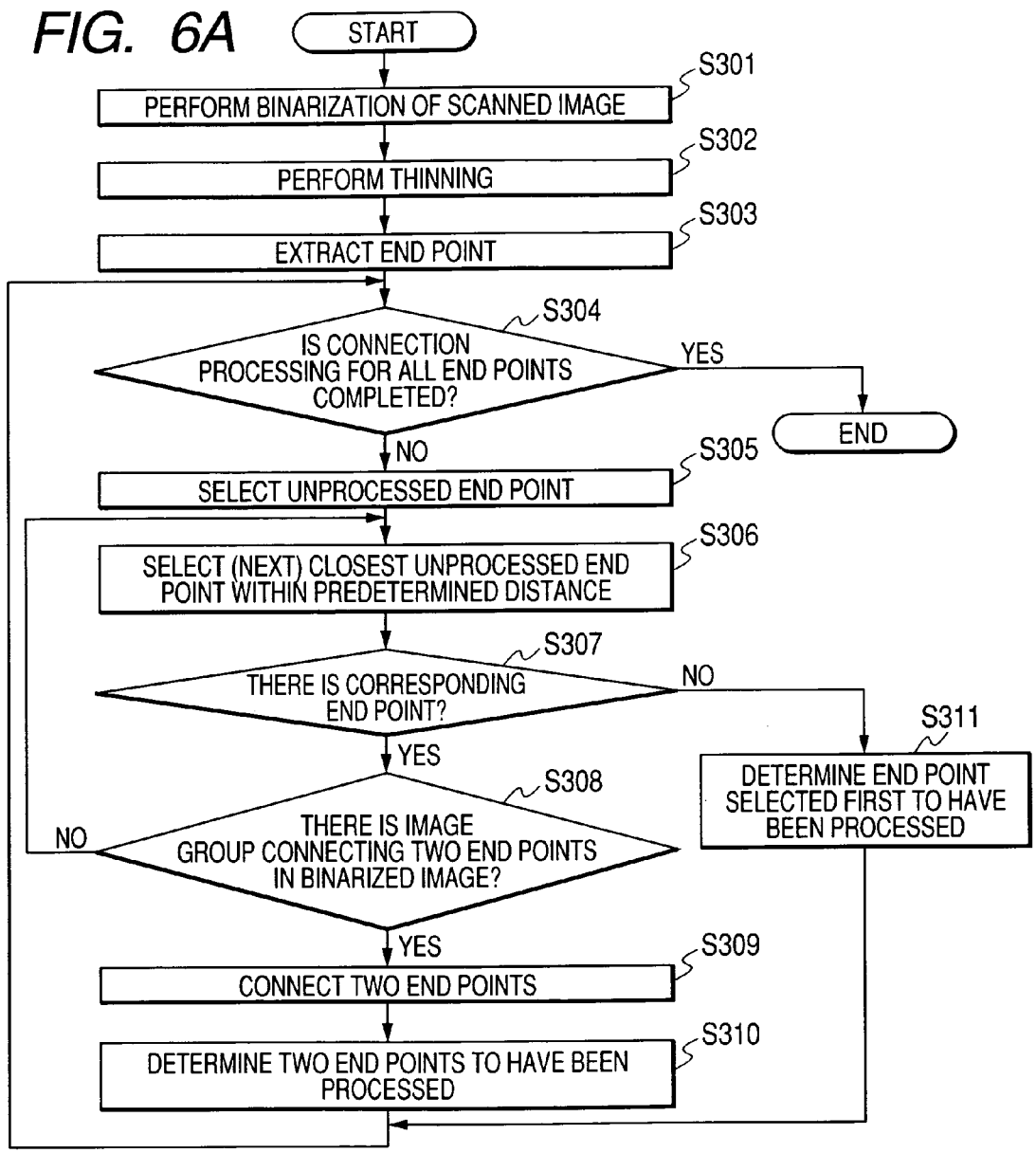
FIGS. 6A and 6B are diagrams illustrating another example of a disconnection correction processing.

In another example of the disconnection correction processing, in order to enhance precision of the disconnection correction processing, image data, which is subjected to the image distortion correction by the distortion correcting unit 5, is used, in addition to the extraction result of the predetermined color component by the correct/incorrect determination extracting unit 8. That is, in another example of the disconnection correction processing, as shown in FIG. 6A, a binarization processing is executed for image data, which was subjected to the image distortion correction by the distortion correcting unit 5 (S301). However, if the binarization processing can be performed at the time of the difference extraction by the difference extracting unit 6 or the extraction of the predetermined color component by the correct/incorrect determination extracting unit 8, image data after the binarization processing may be used.

Further, for the extraction result of the predetermined color component by the correct/incorrect determination extracting unit 8, the thinning processing is executed (S302) and the end point extraction processing is executed (S303). Then, after the endpoint is extracted, the following processing is executed for all extracted end points (S304).

First, one of unprocessed end points is selected (S305), and an unprocessed end point (hereinafter, referred to as 'second endpoint') within a predetermined distance previously set from and closest to the selected end point (hereinafter, referred to as 'first end point') is selected (S306). Then, if there is the second end point (S307), it is judged whether or not a pixel group, which connects the first end point and the second endpoint, exists in image data after the binarization processing (S308). That is, it is judged whether or not there is an overlap portion of the images, which causes the disconnection. As a result, if there is the overlap portion, the first end point and the second end point are connected to each other (S309), and both of the first end point and the second end point are set to have been processed (S310). On the other hand, if there is not the overlap portion, the processing returns to the above-described step (S306), and an end point within a predetermined distance from and next to the first end point is selected as the second end point. At this time, if there is no end point to be selected, the connection between the end points is not performed, and the first end point is set to haven been processed (S311). Such a processing is performed for all end points until the unprocessed end points do not exist (S304 to S311).

Figure 6B:
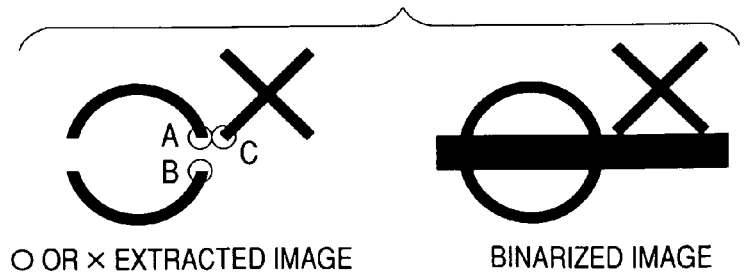

Accordingly, for example, when the figure shown in FIG. 6B is extracted and end points B and C exist in the predetermined distance from an end point A, the end point C closest to the end point A is selected, but, since a pixel group, which connects the end points A and C does not exist in image data after the binarization processing, the end points A and C are not connected to each other. Then, the end point B next to the end point C is selected. In this case, since a pixel group connecting the end point B and the end point A exists in image data after the binarization processing, the end point B is connected to the end point A. That is, there is no case in which 'o' and 'x' are erroneously connected, and the disconnected portion in the figure of 'o' is corrected.

After such a disconnection correction processing by the disconnection correcting unit 9, the figure shape recognizing unit 10 performs the shape recognition for the entry content of the correct/incorrect determination, that is, pattern matching with the figure shape of 'o' or 'x', and recognizes whether the entry content of the correct/incorrect determination is 'correct' or 'incorrect'. Pattern matching to be performed at this time can be implemented by a known technology, and thus the description thereof will be omitted.

Then, if the figure shape recognizing unit 10 performs the shape recognition for the entry content of the correct/incorrect determination, subsequently, the entry position recognizing unit 11 recognizes the entry position on the educational teaching material 20 for the entry content of the correct/incorrect determination. Moreover, at the time of the shape recognition by the figure shape recognizing unit 10, in order to collectively handle a group of consecutive pixels constituting the figure of 'o' or 'x', an identifier is given to the group of consecutive pixels and a labeling processing, which is a general image processing technology, is performed. Accordingly, at the time of the position recognition by the entry position recognizing unit 11, the group of consecutive pixels constituting the figure of 'o' or 'x' is collectively handled by use of the result of the labeling processing.

Here, the recognition processing of the entry position of the correct/incorrect determination by the entry position recognizing unit 11 will be described in detail. FIG. 7 is a flowchart showing an example of the recognition processing sequence of the entry position of the correct/incorrect determination.

In the recognition processing of the entry position of the correct/incorrect determination, since a plurality of correct/incorrect determinations are entered on the educational teaching material 20, first, a count number K for the correct/incorrect determinations is set to '1' (S401). Accordingly, until the count number K exceeds the number of the correct/incorrect determinations, which can exist on the educational teaching material 20, that is, the number of the answer fields 21 (S402), for the correct/incorrect determinations (the figure of 'o' or 'x') detected in a scan sequence previously set, the position is sequentially recognized from the first.

The position recognition can be performed by calculating circumscribed rectangle information of the figure of 'o' or 'x' (S403) and by calculating the center coordinate of the circumscribed rectangle (S404). Specifically, for the figure (the group of consecutive pixels) to be recognized, the circumscribed rectangle is extracted, and xy coordinates of a predetermined point of the circumscribed rectangle (for example, the upper left peak) and the width w and height h of the circumscribed rectangle are calculated. Then, from the calculation result, the center x coordinate=x+w/2 and the center y coordinate=y+h/2 are calculated, and the calculation result becomes the recognition result of the position the group of consecutive pixels, that is, the entry position of the correct/incorrect determination.

Such a processing is performed repeatedly until all the correct/incorrect determinations existing on the educational teaching material 20 are recognized (S402 to S405), while incrementing the value of the count number K (S405).

In such a manner, while the entry position recognizing unit 11 recognizes the entry position of the correct/incorrect determination, the distributed point information recognizing unit 12 recognizes the distributed point information 24 of the educational teaching material 20.

Here, the recognition processing of the distributed point information 24 by the distributed point information recognizing unit 12 will be described in detail.

In the recognition processing of the distributed point information 24, first, the layout analyzing unit 41 performs the layout analysis. FIG. 8 is a diagram illustrating an example of the layout analysis processing.

The layout analyzing unit 41 extracts projection histograms to the vertical and horizontal axes for image data to be processed and performs a region division by finding out separators (long line segments dividing regions), white band regions, or the like therefrom. Further, by repeating the region division, the arrangement configuration of the answer fields 21, the distributed point information 24, and the like on the educational teaching material 20 is recognized. Image data to be processed is obtained by the image reading unit 2 and is subjected to the image distortion correction by the distortion correcting unit 5. Further, image data is preferably binarized. With the binarization, the processing for the region division can be easily performed and precision thereof can be enhanced.

Figure 8A:
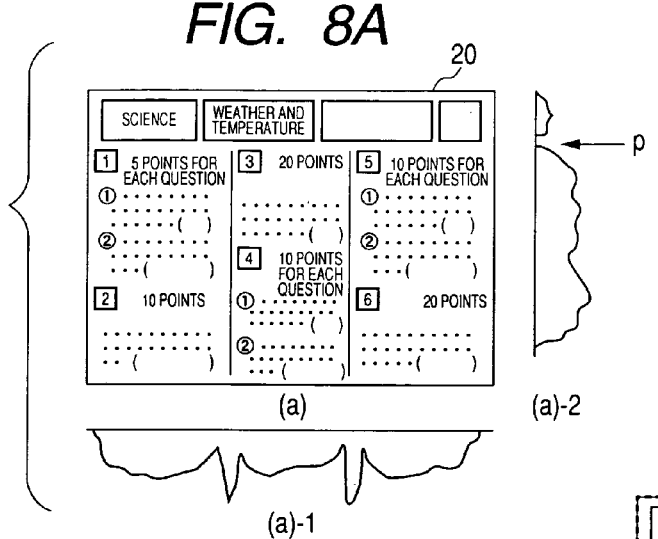
FIGS. 8A to 8D are diagrams illustrating an example of a layout analysis processing to be performed when distributed point information is recognized.
Figure 8B:
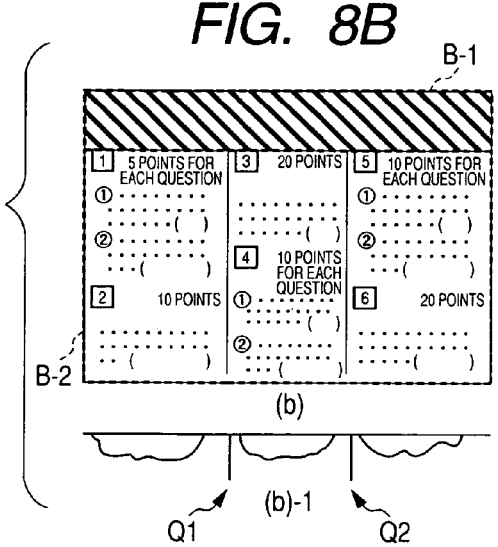
Figure 8C:
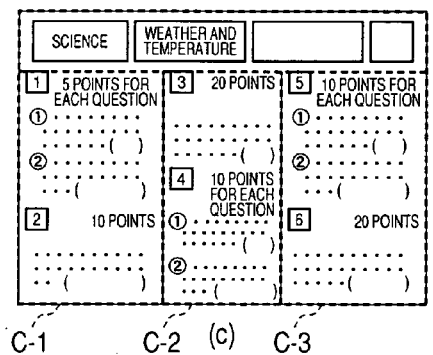
Figure 8D:
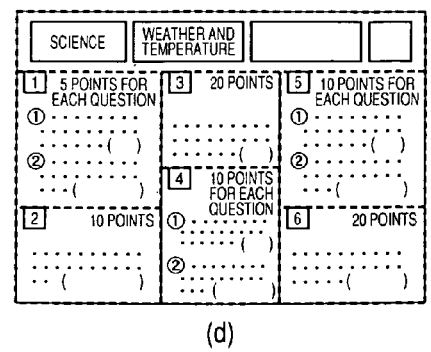

For example, as shown in FIG. 8A, if the projection histograms to the vertical and horizontal axes are extracted for a binarized image A of the educational teaching material 20, the histograms of (a)-1 and (a)-2 are obtained. Among these, in the histogram of (a)-2, a break (frequency is '0') occurs in a place of P in the drawing. Therefore, if this break is judged as the white band region, as shown in FIG. 8B, the region division into B-1 and B-2 regions can be made. In addition, at the time of extracting the projection histogram in the B-2 region, a histogram of (b)-1 is obtained. Moreover, for the vertical axis, the same result as the division of the B-1 and B-2 regions is not obtained, and thus the projection histogram does not need to be extracted. Then, in the histogram of (b)-1, breaks (frequency is '0') at places of Q1 and Q2 in the drawing and places having extremely large frequency occur. Therefore, if the breaks and places are judged as the separators, as shown in FIG. 8C, the region division of the B-2 region into C-1, C-2, and C-3 regions can be additionally made. In addition, if the region division for each of the C-1 region, the C-2 region, and the C-3 region is made in the same manner, the region division shown in FIG. 8D can be made.

If the layout analyzing unit 41 performs the region division by the layout analysis, subsequently, the distributed point information extracting unit 42 performs the extraction of the distributed point information 24. FIG. 9 is a diagram showing an example of the distributed point information extraction processing.

For example, with the layout analysis by the layout analyzing unit 41, the result of the region division shown in FIG. 9A is obtained, and then the distributed point information extracting unit 42 performs the extraction of the distributed point information 24 in terms of a divided region. The extraction of the distributed point information 24 may be performed by performing the character recognition for the characters existing in the respective regions and extracting the characters of 'numeric' and 'point' (for example, the characters, such as 'FIVE POINTS', 'TEN POINTS', and the like). With such a processing, for example, the extraction result of the distributed point information 24 shown in FIG. 9B is obtained. Moreover, when a plurality of distributed point information 24 exist in one region, it is assumed that all of the plurality of distributed point information 24 are extracted.

To the contrary, when the distributed point information does not exist in the region, it is judged as an excessive region division, and the region division processing goes back one step, that is, the recombination is performed. And then, the distributed point information existing in a corresponding region is extracted.

Figure 10B:
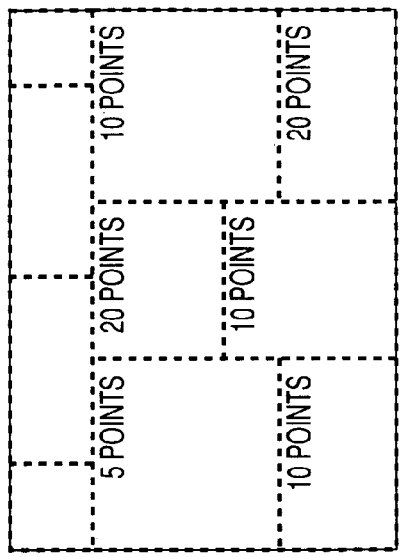
FIGS. 10A to 10C are diagrams illustrating an example of a distributed point specification processing to be performed when the distributed point information is recognized.

After the distributed point information extracting unit 42 extracts the distributed point information 24, the distributed point acquiring unit 43 performs a processing for specifying what point is distributed to each answer on the educational teaching material 20. FIG. 10 is a diagram illustrating an example of a distributed point specification processing.

Figure 10C:
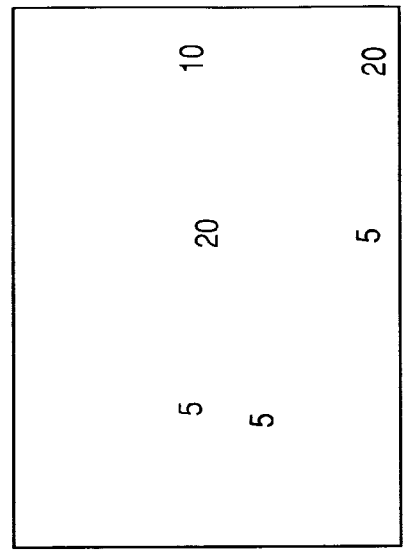
Figure 10A:
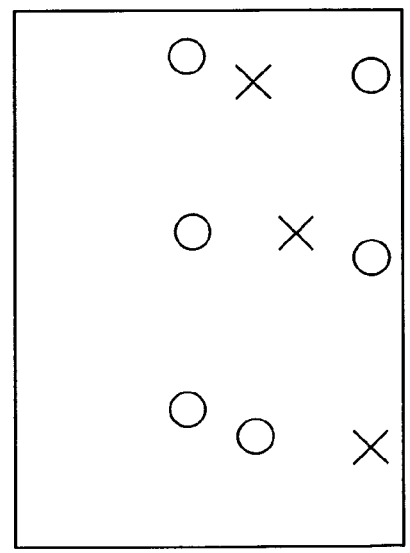

The processing for specifying the distributed points may be performed by causing the entry position recognizing unit 11 to recognize the entry position of the correct/incorrect determination (see FIG. 10A), causing the distributed point information extracting unit 42 to extract the distributed point information 24 existing on the educational teaching material 20 (see FIG. 10B), and correlating them with each other (see FIG. 10C).

The correlation may be performed, for example, on the basis of the distance between the entry position of the correct/incorrect determination and the arrangement position of the distributed point information 24. For example, the entry position of the correct/incorrect determination and the arrangement position of the distributed point information at the closest distance may be correlated with each other. This is because the distributed point information 24 is arranged in the vicinity of the answer field 21 such that the correlation with the answer field 21 of which point is specified by that distributed point information 24 is made clear.

Figure 11:
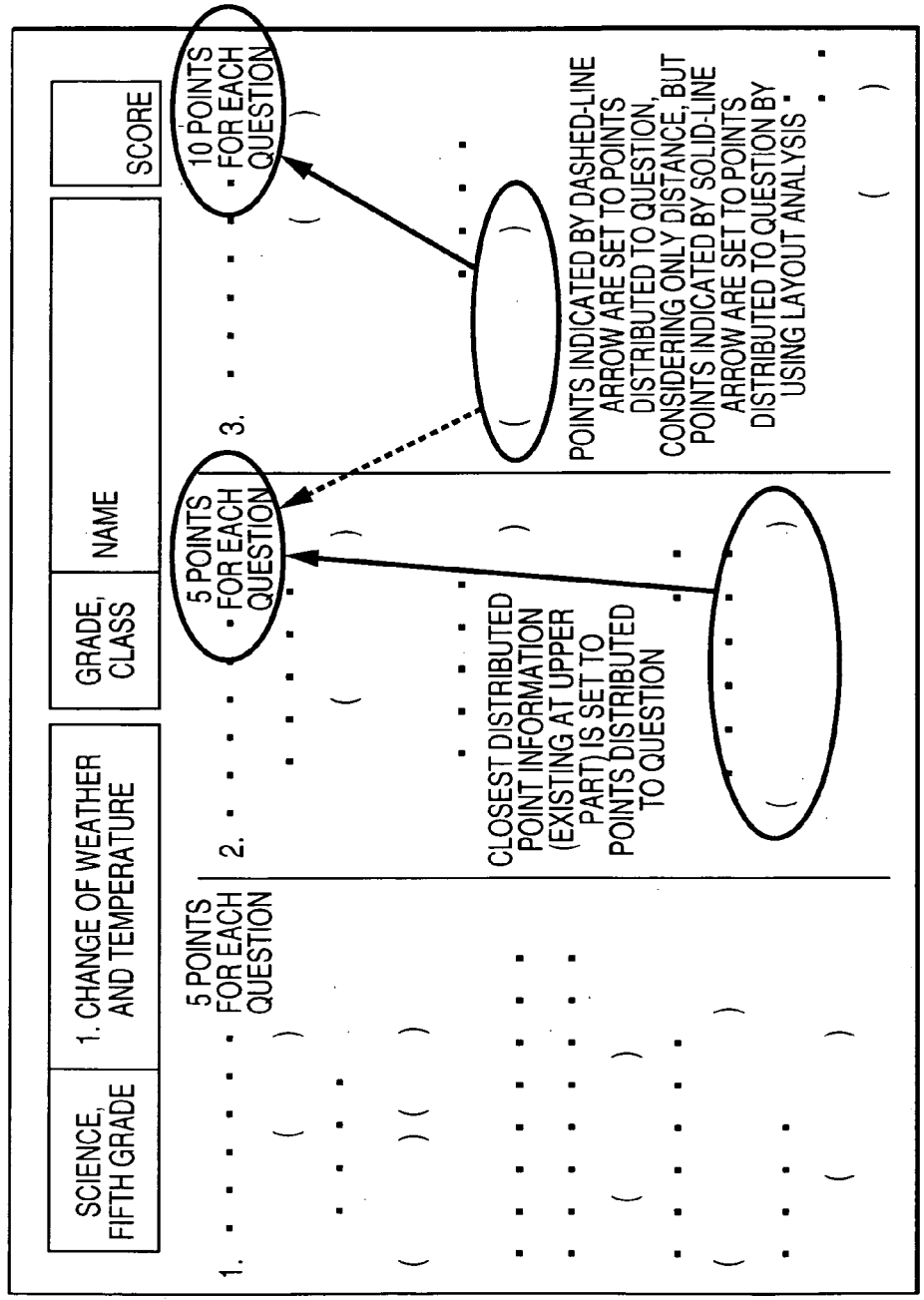
FIG. 11 is a diagram illustrating a specified example of an educational teaching material for explaining the result of the distributed point specification processing.

However, if the layout of the multi-column or the like exists on the educational teaching material 20, only with the distance, the correct correlation is not necessarily performed. For example, in an example shown in FIG. 11, only with the distance, the correlation may be performed in a dotted-line arrow, not in a solid-line arrow.

Therefore, the correlation of the entry position of the correct/incorrect determination and the distributed point information 24 is performed in a manner described below, while using the result of the layout analysis by the layout analyzing unit 41.

For example, since the distributed point information 24 is obtained in terms of the region, the distributed point information 24 in the same region as the region, in which the entry position of the correct determination (the figure of 'o') exists, is set to the distributed point corresponding to the correct/incorrect determination. However, when a plurality of distributed point information 24 exist in the same region, the corresponding distributed point is decided according to a predetermined rule. As the predetermined rule, the distance between the figure and the distributed point information can be used. Specifically, the distributed point information closest to the figure of 'o' upward is used. Further, the predetermined rule may be decided according to the positional relationship, not the distance between the figure and the distributed point information. For example, when the distributed point information 24 exists in the upper portion of the region, the distributed point disposed one the upper side may be used, and, when the distributed point information 24 exists in the lower portion of the region, the distributed point disposed on the lower side may be used.

In such a manner, after the entry position recognizing unit 11 recognizes the entry position of the correct/incorrect determination and the distributed point information recognizing unit 12 recognizes the distributed point to the correct/incorrect determination, the point totaling unit 13 totals the points of the correct/incorrect determinations. At this time, the point totaling unit 13 totals the points on the basis of the recognition result of the entry content of the correct/incorrect determination by the figure shape recognizing unit 10, the recognition result of the entry position of the correct/incorrect determination by the entry position recognizing unit 11, and the recognition result by the distributed point information recognizing unit 12.

In totaling the points of the correct/incorrect determinations, the count number K for correct/incorrect determination is set to '1' first, since a plurality of correct/incorrect determinations are entered on the educational teaching material 20. Accordingly, until the count number K exceeds the number of the correct/incorrect determinations, which can exist on the educational teaching material 20, that is, the number of the answer fields 21, for the correct/incorrect determinations (the figure of 'o' or 'x') detected in a scan sequence previously set, the processing for totaling the points is performed sequentially from the first. That is, for the figure of a K-th correct/incorrect determination, it is judged whether the figure is 'o' or 'x'. As a result, if the figure is 'o', in a 'grading result by questions' to be described below, the distributed point for a K-th correct/incorrect determination is added. Further, if the figure is 'x', the addition of the distributed point for a K-th correct/incorrect determination is not performed and '0' point is given.

Then, such a processing is performed repeatedly until all the correct/incorrect determinations on the educational teaching material 20 are completed, while incrementing the value of the count number K.

Figure 12:
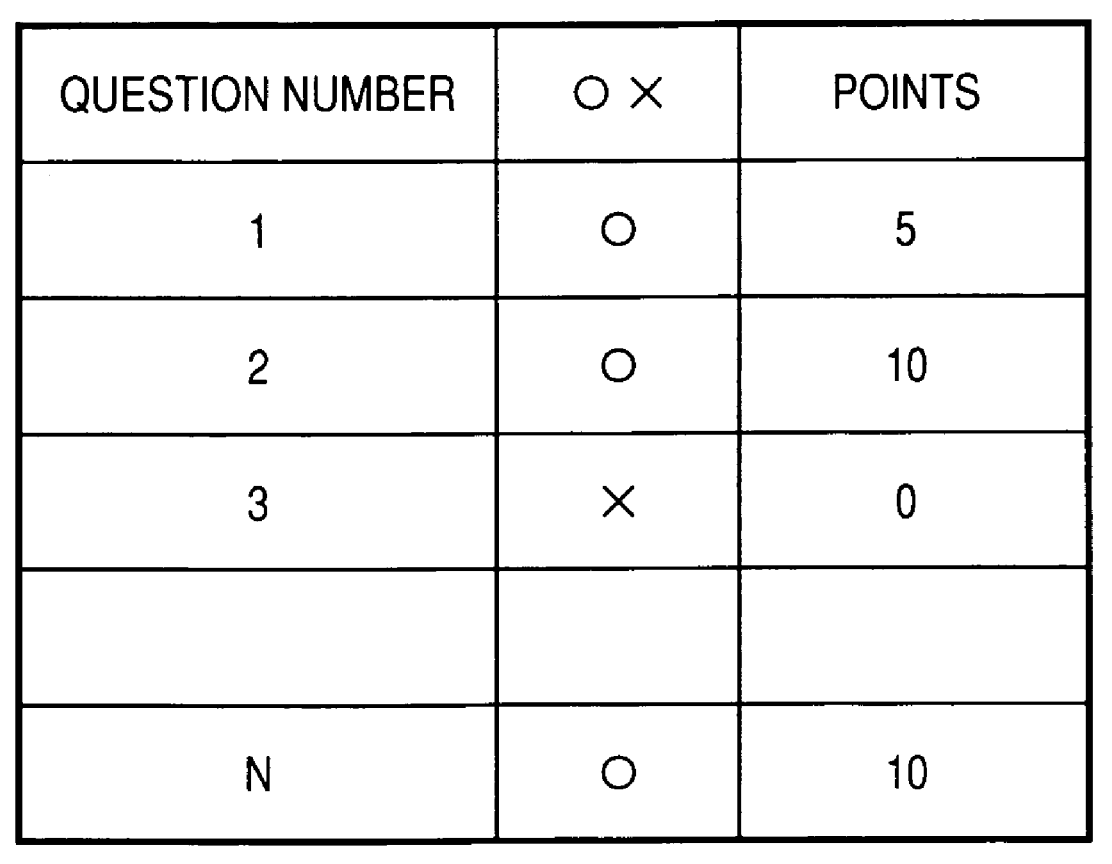

Through the processing described above, the totaled result of the points for the correct/incorrect determinations entered on the educational teaching material 20 is outputted from the point totaling unit 13 as the grading result by questions. FIG. 12 is a diagram illustrating a specified example of the grading result by questions. The grading result by questions is information having a number of a question existing on the educational teaching material 20, the correct/incorrect determination for the answer of that question, and a point on the basis of that correct/incorrect determination, and is outputted from the point totaling unit 13 in a format of a table, in which the question number, the correct/incorrect determination, and the point are correlated with one another.

If the grading result by questions is outputted from the point totaling unit 13, subsequently, the totaled result output unit 14 outputs the grading result by questions, that is, the totaled result of the points by the point totaling unit 13 to the database device 31 or the file server device 32, which is connected to the teaching material processing apparatus, in correlating with the answerer information extracted by the answerer extracting unit 7 (S103 in FIG. 4). Accordingly, in the database device 31 or the file server device 32, the totaled result of the points for the educational teaching material 20 can be managed or utilized, for example, in an outline format.

In a series of processing described above, the case in which the recognition processing of the distributed point information 24 is performed using image data obtained from the educational teaching material 20, on which the answers are entered by a pupil or the like and the correct/incorrect determination are entered by a teacher or the like, has been exemplified, but the recognition processing of the distributed point information 24 may be performed using image data obtained from the educational teaching material 20, on which the answers and the correct/incorrect determinations are not entered. This is because, even when the answers and the correct/incorrect determinations are not entered, the distributed point information 24 exists on the educational teaching material 20. That is, the recognition processing of the distributed point information 24 can be performed in advance. In such a manner, the load of the point totaling processing can be reduced.

In this case, since the figures of the correct/incorrect determinations are not entered, the correlation by the distributed point acquiring unit 43 may be performed for the answer fields 21 on the educational teaching material 20, not for the entry positions of the correct/incorrect determinations. The correlation with the answer fields 21 can be easily implemented by preparing position region information relating to the answer fields 21 in advance. The position region information is information having xy coordinates of a predetermined point (for example, the upper left peak) of a region, which is handled as the answer field 21, and the width w and height h of the circumscribed rectangle, for example, as shown in FIG. 13. The position region information is held and accumulated in the database unit 1 in a format of a table, in which the xy coordinates and the width w and height h are correlated with each other.

Further, when the recognition processing of the distributed point information 24 is performed in advance, the distributed point for each answer field 21 is recognized, and thus, in totaling the points of the correct/incorrect determinations by the point totaling unit 13, the entry positions of the correct/incorrect determinations and the answer fields 21 need to be correlated with each other. This is because the entry of the correct/incorrect determination is performed manually by a teacher or the like and thus the entry position for each answer field 21 is not necessarily analyzed to be uniquely decided. Therefore, in this case, the point totaling unit 13 may perform totaling of the points of the correct/incorrect determinations in a sequence described below. That is, the point totaling unit 13 calculates an overlap area of the circumscribed rectangle of the correct/incorrect determination figure of 'o' or 'x' and the region of the answer field 21 on the educational teaching material 20, correlates the correct/incorrect determination figure and the answer field 21 when that area is the largest (the same is applied to the area ratio to the circumscribed rectangle), and makes that correct/incorrect determination figure the result of the correct/incorrect determination entered for the corresponding answer field 21. However, when the ratio of the overlap area to the circumscribed rectangle is less than a predetermined threshold value, the overlap portion is small, and thus it is judged that the determination for the correlation is impossible. Then, after the correlation is performed, if the correct/incorrect determination figure is 'o', the distributed point specified from the distributed point information for the corresponding answer field 21 is added. When the correct/incorrect determination figure is 'x', the addition of the distributed point for the corresponding answer field 21 is not performed. Such point totaling is performed for all the answer fields 21 on the educational teaching material 20. It is assumed that the region of the answer field 21 on the educational teaching material 20 is specified by answer field position region information.

Besides, the correlation may be performed by the distance from the center coordinates of the circumscribed rectangle of the correct/incorrect determination figure and the region of the answer field 21 or may be simply on the basis of whether or not the overlap portion exists between them, without calculating the overlap area between them.

As described above, in the teaching material processing apparatus, the teaching material processing method, and the teaching material processing program according to the present embodiment, image data read from the educational teaching material 20, on which the entry of the correct/incorrect determination is entered, is compared to electronic data of the educational teaching material 20, that is, data of the educational teaching material 20, on which the answers to the answer fields 21 and the correct/incorrect determinations for the answers are not entered. Then, the entry contents of the correct/incorrect determinations are recognized from the difference between them, and the points of the correct/incorrect determinations are totaled. Therefore, if image reading for the educational teaching material 20, on which the correct/incorrect determinations are entered, is performed, automatic totaling of the grading result for the entered correct/incorrect determinations is performed. As a result, the grading processing for the educational teaching material 20 is simplified. Besides, since the processing is performed on the basis of image data read from the educational teaching material 20, the apparatus configuration can be implemented by a scan function, which is implemented by a copy machine, a multi-functional machine, or a scanner device, an information storing function, an image processing function, and an operation processing function of a computer apparatus of a PC or the like, without needing a dedicated configuration apparatus. In addition, since image data read from the educational teaching material 20 is compared to electronic data held by the database unit 1, if the database unit 1 holds and accumulates electronic data for the educational teaching materials 20, versatility for compatible educational teaching materials can be sufficiently ensured. In addition, if electronic data is held and accumulated in the database unit 1 in advance, when the comparison to image data read from the educational teaching material 20 is performed, a trouble of inputting electronic data to be compared can be removed. As a result, a prompt grading processing can be realized.

Further, in the teaching material processing apparatus, the teaching material processing method, and the teaching material processing program of the present embodiment, the distributed point information 24 on the educational teaching material 20 is extracted from image data obtained by image reading for the educational teaching material 20, and the extraction result of the distributed point information is correlated with the entry contents of the correct/incorrect determinations for the answers on the educational teaching material 20. That is, the distributed point for the correct/incorrect determination for the answer on the educational teaching material 20 is recognized. Therefore, for example, even when a plurality of questions and the answer fields 21 thereof are arranged on the educational teaching material 20 and the distributed points to the questions differ from one another, the correlation between the correct/incorrect determination for the answer into the answer field 21 and the distributed point thereof is made clear, such that totaling of the points of the correct/incorrect determinations by the point totaling unit 13 can be performed. In addition, since the distributed point information 24 of the educational teaching material 20 is used for totaling of the points, the distributed point information does not need to be created or manually inputted before totaling of the points.

That is, according to the teaching material processing apparatus, the teaching material processing method, and the teaching material processing program in the present embodiment, even when the distributed point information 24 is not created or manually inputted in advance for the educational teaching material 20 used in an educational institute, automatic totaling of the points of the entry contents of the correct/incorrect determinations can be performed, thereby realizing simplification of the grading processing. Therefore, convenience for use in the educational institute can be realized, and the grading processing can be smoothly performed with high reliability.

Further, in the teaching material processing apparatus, the teaching material processing method, and the teaching material processing program in the present embodiment, the correlation of the entry position of the correct/incorrect determination and the extraction result of the distributed point information 24, which is performed when the distributed point information 24 on the educational teaching material 20 is recognized, is performed on the basis of the distance between them. That is, for example, on the basis of the closest distributed point information 24, the recognition processing of the distributed point to the correct/incorrect determination is performed. Therefore, the present invention can be suitably applied to a general educational teaching material 20 in which the distributed point is specified by the distributed point information 24 disposed in the vicinity of the answer field 21. Further, the correlation of the correct/incorrect determination and the distributed point, which is required for the point totaling processing, can be accurately performed.

In addition, in the teaching material processing apparatus, the teaching material processing method, and the teaching material processing program in the present embodiment, the layout analysis is performed for image data, and the distributed point information 24 is recognized after the region division corresponding to the multi-column or the like. Therefore, it is possible to cope with the educational teaching material 20 having any layout, and thus versatility for the educational teaching materials 20 can be sufficiently ensured. Besides, in this case, since the distributed point information 24 is reliably recognized through th0e layout analysis, reliability of the grading processing can be sufficiently ensured.

As mentioned above, according to an aspect of the present invention, the present invention provides a material processing apparatus which can total points of the entry contents of correct/incorrect determinations on an educational teaching material to be used in an educational institute, thereby realizing simplification of grading, even when the distributed point is not created or inputted manually in advance, a teaching material processing method, and a teaching material processing program.

According to one aspect of the invention, a teaching material processing apparatus includes: a reading unit that performs image reading for an educational material having answer fields and distributed point information thereof, so as to obtain image data from the educational materials; a correct/incorrect determination recognizing unit that extracts entry contents of correct/incorrect determinations for answers to the answer fields from the image data, with respect to the educational material in which the answers and the correct/incorrect determinations are entered; a distributed point information extracting unit that extracts the distributed point information from the image data with respect to at least one of the educational material in which the answers to the answer fields and the correct/incorrect determinations for the answers are entered and the educational material on which the answers and the correct/incorrect determinations are not entered; a distributed point acquiring unit that correlates an extraction result by the correct/incorrect determination recognizing unit and an extraction result by the distributed point information extracting unit; and a point totaling unit that totals points on the correct/incorrect determinations entered into the educational material according to the extraction result by the correct/incorrect determination recognizing unit, the extraction result by the distributed point information extracting unit, and a result of correlation by the distributed point acquiring unit.

According to another aspect of the invention, a teaching material processing method includes: performing image reading for an educational material having answer fields and distributed point information thereof, so as to obtain image data from the educational material; extracting entry contents of correct/incorrect determinations for answers to the answer fields from the image data, with respect to the educational material in which the answers and the correct/incorrect determinations are entered; extracting the distributed point information from the image data with respect to at least one of the educational material in which the answers to the answer fields and the correct/incorrect determinations for the answers are entered and the educational material on which the answers and the correct/incorrect determinations are not entered; correlating a result in the step of extracting the entry contents of the correct/incorrect determinations and a result in the step of extracting the distributed point information; and totaling the points on the correct/incorrect determinations entered into the educational material according to the result in the step of extracting the entry contents of the correct/incorrect determinations, the result in the step of extracting the distributed point information, and a result in the correlating step.

According to another aspect of the invention, a program product for enabling a computer to perform processing of image data from an educational material that has answer fields, wherein the computer is connected to an image reading apparatus for acquiring the image data by performing image reading on the educational material, includes: software instructions for enabling the computer to perform predetermined operations; and a computer recordable medium bearing the software instructions; wherein the predetermined operations includes: performing image reading for an educational material having answer fields and distributed point information thereof, so as to obtain image data from the educational material; extracting entry contents of correct/incorrect determinations for answers to the answer fields from the image data, with respect to the educational material in which the answers and the correct/incorrect determinations are entered; extracting the distributed point information from the image data with respect to at least one of the educational material in which the answers to the answer fields and the correct/incorrect determinations for the answers are entered and the educational material on which the answers and the correct/incorrect determinations are not entered; correlating a result in the step of extracting the entry contents of the correct/incorrect determinations and a result in the step of extracting the distributed point information; and totaling the points on the correct/incorrect determinations entered into the educational material according to the result in the step of extracting the entry contents of the correct/incorrect determinations, the result in the step of extracting the distributed point information, and a result in the correlating step.

Moreover, in the present embodiment, the present invention has been described, but the present invention is not limited to that description. For example, the distortion correction processing, the disconnection correction processing, or the like may be not necessarily performed. Further, while the marking of test papers is done to enter the figure (◯) for a correct answer and the figure (x) for an incorrect answer in the embodiment as above, another figures may be used. For example, a check mark can be used for a correct answer.

As such, various changes can be made within the scope without departing from the subject matter of the present invention read on the description of the present embodiment.

What is claimed is:

1. A material processing apparatus comprising:
 a reading unit that performs image reading for a material having answer fields and distributed point information thereof, so as to obtain image data from the material;
 a correct/incorrect determination recognizing unit that extracts correct/incorrect determinations for answers to the answer fields from the image data, with respect to the material in which the answers and the correct/incorrect determinations are entered in handwriting;
 a distributed point information extracting unit that extracts the distributed point information from the image data with respect to at least one of the material in which the answers to the answer fields and the correct/incorrect determinations for the answers are entered and the material on which the answers and the correct/incorrect determinations are not entered;
 a layout analyzing unit that divides the image data read by the reading unit into a plurality of regions in accordance with at least one of an image object representing a separator in the image data and a white band region in the image data;

a distributed point acquiring unit that correlates, for each of the regions, the extracted handwritten correct/incorrect determinations with the extracted distributed point information existing in the same divided region; and a point totaling unit that adds points indicated by the distributed point information extracted by the distributed point information extracting unit using (i) the correct/incorrect determinations for answers according to the extraction result by the correct/incorrect determination recognizing unit and (ii) a result of correlation by the distributed point acquiring unit, wherein the distributed point information extracting unit extracts the distributed point information from the image data using character recognition.

2. The material processing apparatus according to claim 1, wherein, when the material has a plurality of answer fields and a plurality of distributed point information, the distributed point acquiring unit recognizes a distance between one of a position of each answer field and an entry position of an answer entered into each answer field on the material and an arrangement position of the distributed point information on the material, from an extraction result by the correct/incorrect determination recognizing unit and an extraction result by the distributed point information extracting unit, and correlates the extraction result by the correct/incorrect determination recognizing unit and the extraction result by the distributed point information extracting unit on the basis of a recognition result of the distance.

3. The material processing apparatus according to claim 1, further comprising:

a layout analyzing unit that performs a layout analysis on the image data with respect to at least one of the material on which the answers to the answer fields and the correct/incorrect determinations for the answers are entered and the material on which the answers and the correct/incorrect determinations are not entered, and notifies a result of the layout analysis to the distributed point acquiring unit.

4. A material processing method comprising:

performing image reading for a material having answer fields and distributed point information thereof, so as to obtain image data from the material;

extracting correct/incorrect determinations for answers to the answer fields from the image data, with respect to the material in which the answers and the correct/incorrect determinations are entered in handwriting;

extracting the distributed point information from the image data with respect to at least one of the material in which the answers to the answer fields and the correct/incorrect determinations for the answers are entered and the material on which the answers and the correct/incorrect determinations are not entered;

dividing the image data read by the reading unit into a plurality of regions in accordance with at least one of an image object representing a separator in the image data and a white band region in the image data;

correlating, for each of the regions, the extracted handwritten correct/incorrect determinations with the extracted distributed point information existing in the same divided region; and adding the points indicated by the distributed point information extracted by the step of extracting the distributed point information using (i) the correct/incorrect determinations for the answers according to the result in the step of extracting by the step of extracting the correct/incorrect determinations, and (ii) a result in the correlating step, wherein the step of extracting the distributed point information extracts the distributed point information from the image data using character recognition.

5. A program product for enabling a computer to perform processing of image data from a material that has answer fields, wherein the computer is connected to an image reading apparatus for acquiring the image data by performing image reading on the material, the program product comprising:

software instructions for enabling the computer to perform predetermined operations; and a non-transitory computer recordable medium bearing the software instructions;

wherein the predetermined operations includes:

performing image reading for a material having answer fields and distributed point information thereof, so as to obtain image data from the material;

extracting correct/incorrect determinations for answers to the answer fields from the image data, with respect to the material in which the answers and the correct/incorrect determinations are entered in handwriting;

extracting the distributed point information from the image data with respect to at least one of the material in which the answers to the answer fields and the correct/incorrect determinations for the answers are entered and the material on which the answers and the correct/incorrect determinations are not entered;

dividing the image data read by the reading unit into a plurality of regions in accordance with at least one of an image object representing a separator in the image data and a white band region in the image data;

correlating, for each of the regions, the extracted handwritten correct/incorrect determinations with the extracted distributed point information existing in the same divided region; and adding the points indicated by the distributed point information extracted by the step of extracting the distributed point information using (i) the correct/incorrect determinations for the answers according to the result in the step of extracting by the step of extracting the correct/incorrect determinations, and (ii) a result in the correlating step, wherein the step of extracting the distributed point information extracts the distributed point information from the image data using character recognition.

6. The material processing apparatus according to claim 1, further comprising a correcting unit that performs a disconnection processing on the correct/incorrect determinations extracted by the correct/incorrect determination recognizing unit, wherein the disconnection processing connects extracted line segments as appropriate.

7. The material processing method according to claim 4, further comprising performing a disconnection processing on the extracted correct/incorrect determinations, wherein the disconnection processing connects extracted line segments as appropriate.

8. The program product of claim 5, further comprising the predetermined operations of:

performing a disconnection processing on the extracted correct/incorrect determinations, wherein the disconnection processing connects extracted line segments as appropriate.

* * * * *